(12) United States Patent
Leterrier et al.

(10) Patent No.: US 11,104,213 B2
(45) Date of Patent: Aug. 31, 2021

(54) OPTIMIZED HATCH POSTS

(71) Applicant: COMPAGNIE PLASTIC OMNIUM, Lyons (FR)

(72) Inventors: Franck Leterrier, Lagnieu (FR); Didier Porcherot, Lyons (FR)

(*) Notice: Subject to any disclaimer, the term of this patent is extended or adjusted under 35 U.S.C. 154(b) by 257 days.

(21) Appl. No.: 16/299,457

(22) Filed: Mar. 12, 2019

(65) Prior Publication Data
US 2019/0275868 A1 Sep. 12, 2019

(30) Foreign Application Priority Data
Mar. 12, 2018 (FR) ..................... 1852096

(51) Int. Cl.
| | | |
|---|---|---|
| *B60J 5/10* | (2006.01) | |
| *B60J 10/84* | (2016.01) | |
| *B60J 1/00* | (2006.01) | |
| *B60J 1/18* | (2006.01) | |
| *B60R 13/02* | (2006.01) | |

(52) U.S. Cl.
CPC ............... *B60J 5/107* (2013.01); *B60J 1/006* (2013.01); *B60J 1/18* (2013.01); *B60J 5/101* (2013.01); *B60J 10/85* (2016.02); *B60R 13/0243* (2013.01); *E05Y 2800/12* (2013.01); *E05Y 2900/546* (2013.01); *E05Y 2900/548* (2013.01)

(58) Field of Classification Search
CPC ....... B60J 5/107; B60J 5/101; B60R 13/0243; E05Y 2900/546; E05Y 2900/548
USPC ..................................................... 296/146.8
See application file for complete search history.

(56) References Cited

U.S. PATENT DOCUMENTS

| | | | | |
|---|---|---|---|---|
| 4,537,115 A | * | 8/1985 | Haesters | B60H 1/248 454/165 |
| 4,880,267 A | * | 11/1989 | Ohya | B60J 5/101 296/56 |
| 7,905,533 B2 | * | 3/2011 | Andre | B60J 5/101 296/56 |

(Continued)

FOREIGN PATENT DOCUMENTS

| | | |
|---|---|---|
| EP | 1918144 A1 | 5/2008 |
| EP | 3241700 A1 | 11/2017 |

(Continued)

OTHER PUBLICATIONS

EP 19160545 European search report and search strategy dated Jul. 22, 2019.

(Continued)

*Primary Examiner* — Hilary L Gutman
(74) *Attorney, Agent, or Firm* — Anglehart et al.

(57) ABSTRACT

Vehicle hatch comprising at least one lateral post, to which a rear window is attached, the post forming a profile having an open cross section and comprising a first and a second U-shaped cavity that each comprise two walls. The first cavity is oriented towards the median plane of the vehicle and comprises a rear wall and a front wall, and the second cavity is oriented towards the rear of the vehicle and comprises an inside wall and an outside wall. The front wall of the first cavity is arranged so as to be continuous with the outside wall of the second cavity, and the rear wall of the first cavity is separated from the inside wall of the second cavity so as to free up a free space that allows for access to the inner portion of the profile.

13 Claims, 3 Drawing Sheets

(56) References Cited

U.S. PATENT DOCUMENTS

| | | | | |
|---|---|---|---|---|
| 9,186,965 | B2* | 11/2015 | Lathwesen | B60J 5/107 |
| 9,469,180 | B2* | 10/2016 | Kamimura | B60J 5/101 |
| 10,399,614 | B2* | 9/2019 | Depardon | B60J 5/101 |
| 10,792,984 | B2* | 10/2020 | Coudron | B60J 10/84 |
| 2009/0294196 | A1* | 12/2009 | Stahl | B62D 25/12 |
| | | | | 180/69.21 |
| 2016/0236723 | A1* | 8/2016 | Ikeda | B62D 25/08 |
| 2017/0066306 | A1* | 3/2017 | Ueno | B60J 5/107 |
| 2017/0174059 | A1* | 6/2017 | Miyake | E05D 5/0207 |
| 2019/0193534 | A1* | 6/2019 | Chiba | E05F 3/224 |
| 2019/0193535 | A1* | 6/2019 | Chiba | B60J 5/101 |

FOREIGN PATENT DOCUMENTS

| | | | | | |
|---|---|---|---|---|---|
| EP | 3549804 | A1 | * | 10/2019 | B60J 5/107 |
| FR | 2916689 | A1 | * | 12/2008 | B60J 10/80 |
| FR | 2927876 | A1 | * | 8/2009 | B60J 10/70 |
| FR | 3037286 | A1 | | 12/2016 | |
| FR | 3041571 | A1 | | 3/2017 | |
| JP | 57164811 | A | * | 10/1982 | B60J 5/101 |
| JP | H5-29816 | U | | 4/1993 | |
| JP | 2001-328429 | A | | 11/2001 | |
| JP | 2014019359 | A | * | 2/2014 | |
| JP | 2014076707 | A | * | 5/2014 | |

OTHER PUBLICATIONS

FR 1852096 preliminary search report dated Sep. 12, 2018.
FR 1852096 written opinion dated Sep. 12, 2018.

\* cited by examiner

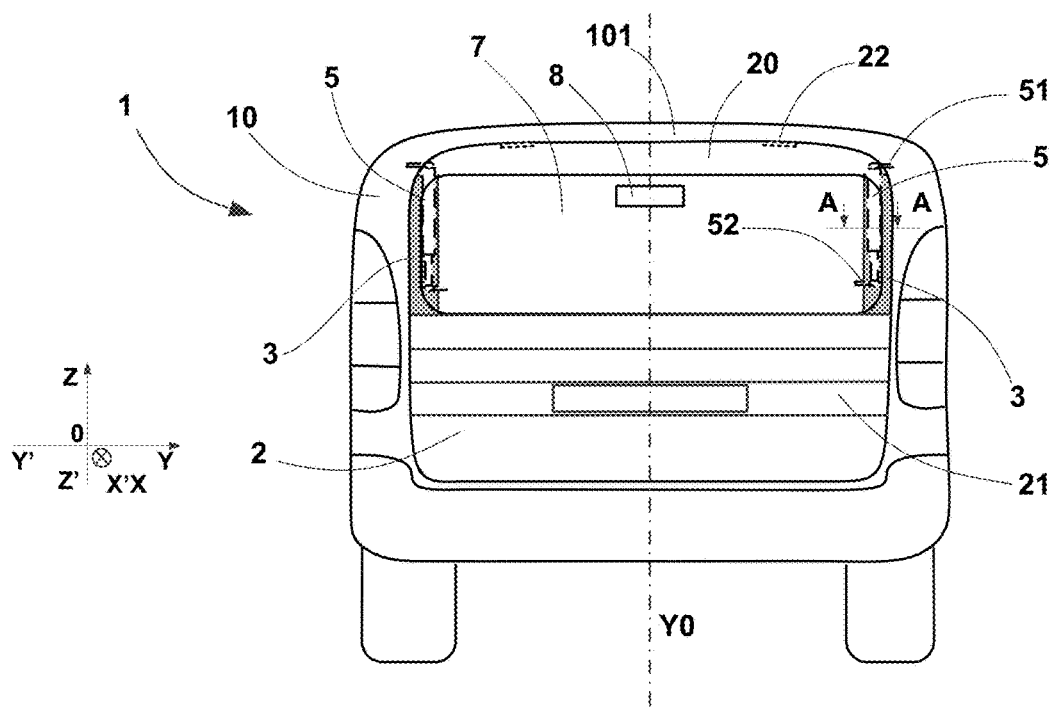
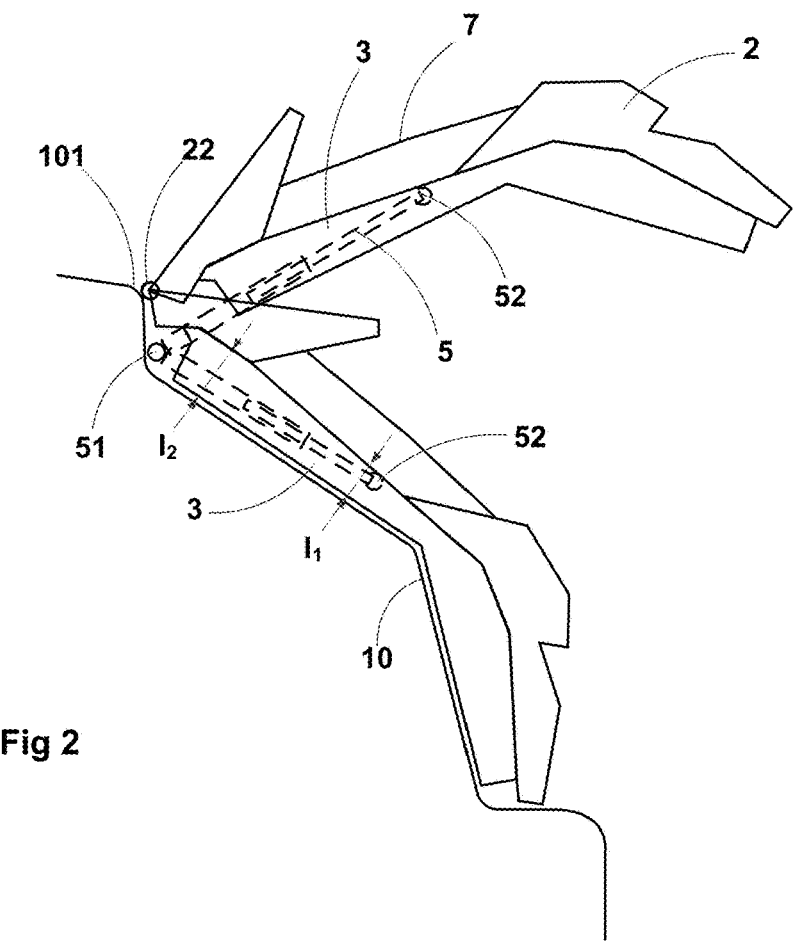
Fig 1
Fig 2

OPTIMIZED HATCH POSTS

FIELD OF THE INVENTION

The invention relates to the field of motor vehicles and more particularly vehicles comprising a rear hatch made of plastics material.

BACKGROUND

The hatch closing the rear opening of the vehicle comprises an upper portion that is connected, by means of hinges, to a roof segment of the vehicle, a lower portion containing technical elements such as the opening controller or the illumination means for the number plate, and comprises an opening for receiving a rear window. The upper portion and the lower portion are connected by means of two posts. The rear window is adhesively bonded, over the entire periphery thereof, to a bonding track that is arranged on the posts and on the lower and upper portions.

The hatch may preferably be formed by means of molding, from a thermosetting or thermoplastic material.

The profile of the posts has to comply with a plurality of specific and sometimes contradictory constraints.

Indeed, in addition to the structural rigidity required in order to withstand, without deformation, stresses associated with opening and closing operations, the width of the posts determines the rear field of view and the width of the rear opening providing access to the storage compartment. Moreover, the posts have to receive bearing surfaces, on the side of the vehicle body, that are intended for being brought into contact with a seal mounted on the fixed portion of the vehicle, as well as a bonding track, on the outside edge, that is intended for receiving the rear window. The posts are also capable of accommodating technical equipment such as a wiring harness or actuators intended for facilitating the opening and closing operations for the hatch. The presence of said technical equipment is associated with some accessibility constraints in order to facilitate the initial installation and then the maintenance of said equipment. Finally, the posts may come to play a role in the aerodynamism of the vehicle and, depending on the visibility thereof, influence the overall appearance of the vehicle. For this purpose, a silk-screen printed deposit, of a generally muted color, the width of which adversely affects the aesthetics of the vehicle and the rear view, is deposited on the periphery of the rear window in order to cover the technical portion of the post which would be visible to the outside, through the window.

In addition to all these constraints, there are also constraints specific to the molding method used to industrially produce the hatch from a thermoplastic or thermosetting material. The posts are therefore usually open shapes without undercuts and are easy to release from the mold.

In addition, a plurality of publications describing the cross section of the posts explain the approaches taken by vehicle designers in order to satisfy all or some of the requirements set out above.

FR 3 037 286 describes a hatch post having an H-shaped cross section that makes it possible to accommodate the actuator. The overall width of the post is substantially equal to the sum of the transverse dimensions of the bonding track, the bearing surface of the seal, and the actuator. This measure reduces the width of the rear field of view.

FR 3 041 571 describes a U-shaped post comprising a trim on the inner wall of the U that is curved away from the median plane Y0, towards the lateral edges of the vehicle, in order to close the opening of the profile and in order to increase the rear field of view.

EP 3 241 700 describes a hatch post that also has a U-shaped cross section that faces the rear of the vehicle. The base of the U forms the bearing surface of the seal and comprises a protrusion that is oriented towards the front of the vehicle in order to hide the seal from view from the interior of the passenger compartment. The outside lateral wall of the U extends towards the edge of the vehicle, away from the median plane Y0, in order to form a bonding track on the rear window, and continues, assuming an aerodynamic shape and extending as a protrusion, towards the rear of the vehicle. This arrangement does not make it possible to increase the rear field of view, and does not provide for accommodation of the technical equipment.

JP2001-328429 proposes an injection-molded thermoplastic hatch comprising posts having a U-shaped cross section that is open towards the rear of the vehicle, and comprising an inner partition in order to increase the rigidity of the post.

SUMMARY

The object of the invention is that of proposing a hatch that is preferably formed by molding, from a thermoplastic or thermosetting material and that makes it possible to meet all the requirements set out above.

The hatch according to the invention comprises at least one lateral post, to which a rear window is attached, said post forming a profile having an open cross section and comprising a first and a second U-shaped cavity that each comprise two lateral walls.

The posts of the hatch are characterized in that, when the hatch is in the closed position, the first cavity faces the median plane Y0 of the vehicle, such that the U comprises a rear wall that is arranged towards the rear of the vehicle and a front wall that is arranged towards the front of the vehicle, and in that the second cavity is oriented towards the rear portion of the vehicle, such that the U comprises an inside wall that is arranged on the side of the median plane, and an outside wall that is arranged opposite the median plane towards the lateral edge of the vehicle, and in that the front wall of the first cavity is arranged so as to be continuous with the outside wall of the second cavity, and in that the rear wall of the first cavity is separated from the inside wall of the second cavity so as to free up a free space that allows for access to the inner portion of the profile formed by the inside space of said two U shapes.

This specific shape of the cross section of the post makes it possible to meet the requirements with respect to mechanical rigidity and the reduction in the transverse dimensions of said post, in that it makes it possible to align the longitudinal direction of the sealing bearing surface and the bonding track. This results in a reduction in the width of the post and a reduction in the width of the silk-screen print deposited on the outline of the rear window. Moreover, this arrangement of two adjacent U-shaped volumes creates an interior space that makes it possible to arrange the actuator and the cable harness in separate recesses in order to protect said equipment from any physical interaction that may cause malfunctioning.

The hatch according to the invention may comprise the following features, alone or in combination:

- The front face of the front wall of the first cavity forms a bearing surface that is intended to be brought into contact with a seal arranged on the body of the vehicle.

The rear window is adhesively bonded to the outer face of the rear wall of the first cavity.

A cable harness runs inside the interior space defined by the first cavity.

An actuator, which is hinged between the roof segment and the hatch, is arranged in the interior space of the second cavity in order to facilitate the opening or closing of the hatch.

The length of the inside wall of the second cavity is shorter than that of the outside wall of said second cavity, so as to increase the rear field of view.

The length of the inside wall of the second cavity is greater than that of the outside wall of said second cavity, and the extension of the inside wall of the second cavity curves away from the median plane towards the lateral edge of the vehicle, forming a non-zero angle with the longitudinal direction XX', so as to increase the rear view.

A reinforcement part is arranged on the inner or outer wall of the second cavity.

The reinforcement part extends from the outside wall of the second cavity as far as the end of the rear wall of the first cavity.

The rear wall of the first cavity forms a non-zero angle with the transverse direction YY'.

A removable trim element is arranged between the end of the rear wall of the first cavity and the end of the inside wall of the second cavity, in order to block the free passage of the profile that forms the post.

The profiles of the posts are formed integrally with the upper portion and the lower portion of the hatch, the hatch being produced by means of molding, from a thermosetting or thermoplastic material.

BRIEF DESCRIPTION OF THE DRAWINGS

The invention will be better understood upon considering the accompanying drawings, which are provided by way of example and are in no way limiting, and in which:

FIG. 1 is a schematic view of the rear of a vehicle equipped with a hatch comprising actuators.

FIG. 2 is a schematic side view showing the hatch in then open position and in the closed position.

DETAILED DESCRIPTION

Figure 3:
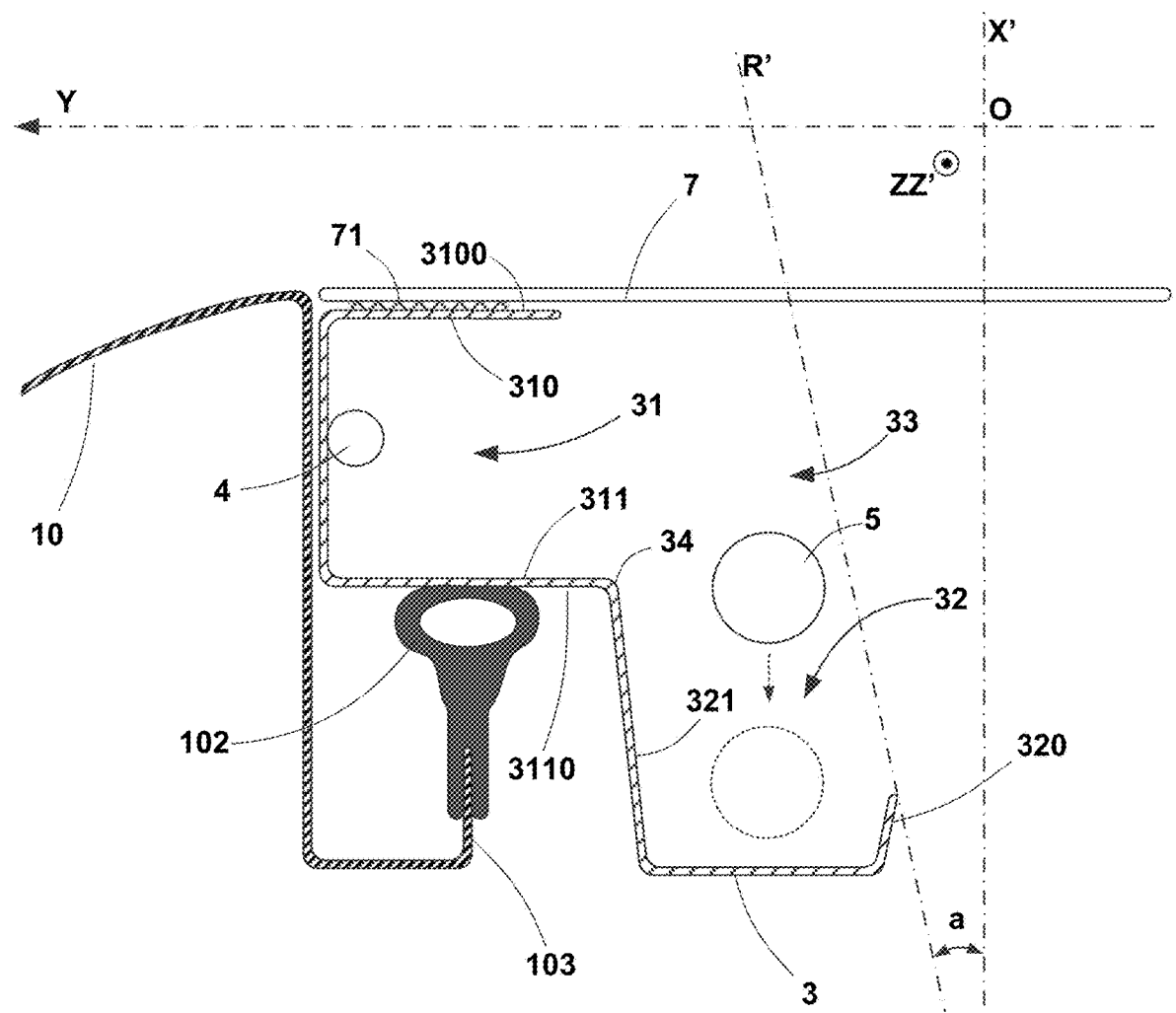
FIG. 3 is a schematic view, in a cross section according to A-A, of a hatch post according to the invention.

The rear portion of the vehicle 1, shown in FIG. 1, shows the rear hatch 2 closing the rear opening. As used in the present disclosure, the term hatch refers to the rear door of a vehicle which typically opens upwards. The terms hatchback and tailgate may be used to refer to the same element.

In the following, the orthonormal frame of reference OXYZ will be considered, in which the axis X'OX represents the longitudinal axis oriented from the rear to the front, the axis Y'OY represents the transverse axis oriented from left to right, the axis Z'OZ represents the vertical axis oriented from bottom to top. The plane Y0, which is perpendicular to the axis Y'OY, corresponds to the median plane of the vehicle.

The hatch 2 comprises an upper portion 20 and a lower portion 21 which are interconnected by means of two lateral posts 3.

The upper portion 20 is connected by means of hinges 22 to the roof segment 101 that forms part of the body 10 of the vehicle 1. A rear window 7 is adhesively bonded, at the periphery thereof, to the posts 3 and to the upper and lower portions of the hatch.

Actuators 5, intended for facilitating the operations for opening and closing the hatch, are arranged laterally at the side of each of the posts 3 and are connected, at each of the ends thereof, to pivoting attachment points 51 and 52 that are arranged on the body 10 and on the posts 3 of the hatch 2, respectively. By way of example, the actuator 5 may be a jack of the gas-actuated jack type, or a screw jack that is rotated by an electric motor.

FIG. 2 shows the hatch in the open position and in the closed position. For stylistic reasons, it is noted here that, in the closed position, the posts and the inner window form a specified angle with the vertical position. The cross section of the posts according to A-A is formed by the intersection of said posts with a plane perpendicular to the direction of said angle, and corresponds to the cross section of said post.

It is also taken into account that the relative positions "front" and "rear", with respect to the vehicle, apply to the hatch when said hatch is in the closed position, the positions "front" and "rear" remaining independent of the angle of inclination of the post relative to the vertical.

FIG. 3 is a cross section of the right-hand lateral post 3 that is symmetric to the left-hand lateral post.

A first U-shaped cavity 31 opens towards the median plane Y0. Said first cavity 31 comprises a rear wall 310 and a front wall 311 that are each oriented substantially along the YY' axis.

The second U-shaped cavity 32 opens towards the rear of the vehicle and comprises an inside wall 320 and an outside wall 321 that are each oriented substantially along the XX' axis.

The front wall 311 of the first cavity is connected to the outside wall 321 of the second cavity, such that said two walls join and form, therebetween, at the point of convergence 34, a specified angle that is close to a right angle.

The rear wall 310 of the first cavity 31 and the inside wall 320 of the second cavity 32 are separated so as to leave a free space 33 that allows for access to the inside of the post in order to improve the accessibility of said space during installation and assembly operations our maintenance and repair operations for technical members contained in said post.

The rear face 3100 of the rear wall 310 of the first cavity 31 forms a bonding track to which the rear window 7 is adhesively bonded by means of adhesive tape 71.

The front face 3110 of the front wall 311 of the first cavity 31 forms a bearing surface on which a seal 102, mounted on a rabbet 103 of the body 10, comes to rest.

The front wall has to provide a sufficiently wide support for receiving the squashed seal. A width of from 25 to 50 mm, and preferably from 30 mm to 40 mm, appears to be suitable.

The rear wall has to provide a large enough width for the bonding track. Said width varies from 15 mm to 50 mm, and preferably from 20 mm to 30 mm.

The sealing bearing surface 3110 and the bonding track 3100 are thus aligned, one behind the other, in the direction XX', which makes it possible to reduce the dimensions of said two functional surfaces in the direction YY', with the aim of increasing the rear field of view. Furthermore, since the sealing bearing surface is arranged closer to the lateral end of the rear window, it is possible to increase the width of the rear opening.

A cable harness 4, which is intended for supplying the equipment arranged in the hatch, is accommodated in the first cavity 31.

The actuator 5, which is intended to facilitate the movements for opening and closing the hatch, is arranged in the second cavity 32. The dotted circle shows the position of the actuator when the hatch is in the open position.

As can be seen in FIG. 2, it is necessary to provide a free space in the direction) (X' in order to allow the actuator 5 to travel between the open position and the closed position. The length of the inside 320 and outside 321 side walls of the second cavity 32 thus increases in a direction extending from a lower end of the hatch ($I_1$) as far as a roof segment ($I_2$), so as to allow the actuator to travel inside the two cavities during movements of the hatch about the hinge ($I_1 > I_2$).

Since the first cavity 31 is separate from the second cavity 32, it is thus possible to prevent any contact between the cable harness 4 and the actuator 5.

It will also be noted that the second cavity projects towards the front, and thus makes it possible to hide the seal 102 from view from the inside of the passenger compartment.

The walls of each of the cavities are not necessarily of equal lengths.

Thus, in the case of the post 3 shown in FIG. 3, the inside wall 320 of the second cavity 32 is shorter than the outside wall 321. This arrangement makes it possible to increase the rear field of view by increasing the angle formed by a straight line RR' passing through the rearview mirror and through the rear end of the inside wall 320 of the second cavity 32.

Figure 4:
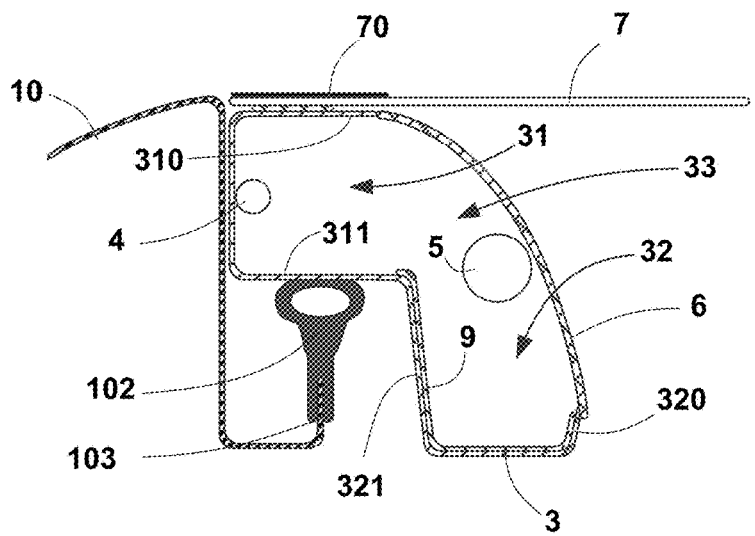
FIG. 4 is a schematic cross-sectional view of a hatch post according to a first embodiment of the invention.

FIG. 4 shows the case, according to a first embodiment, in which it proves necessary, for reasons of mechanical resistance, to reinforce the rigidity of the post 3. For this purpose, a reinforcement part 9 may be attached, by means of adhesive bonding or by welding, in the outside, or preferably inside, portion of the second cavity 32.

Figure 5:
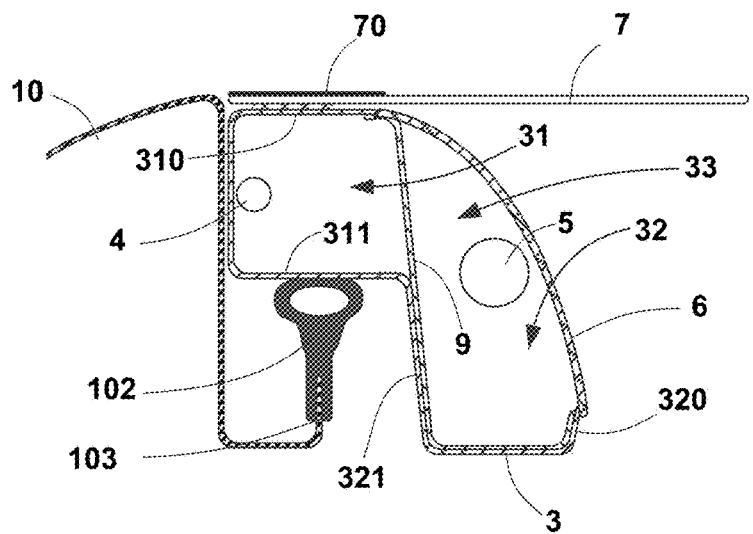
FIG. 5 is a schematic cross-sectional view of a hatch post according to a second embodiment of the invention.

FIG. 5 shows the case, according to a second embodiment, in which, again for reasons of mechanical resistance, it is necessary to extend the portion of the reinforcement part 9 arranged on the outside wall 321 of the second cavity 32 as far as the end of the rear wall 310 of the first cavity 31. In so doing, the accessibility to the inside portion of the first cavity 31 containing the cable harness is impaired in part, but the partitioning between the two cavities is improved and any risk of contact between the actuator and the cable harness is eliminated.

It is optionally also possible, in all the above embodiments, to close the free passage 33 by means of a removable trim element 6 that has a decorative function and is arranged between the end of the rear wall 310 of the first cavity 31 and the end of the inside wall 320 of the second cavity 32. Said trim element 6 can usefully be inclined away from the median plane Y0 so as to increase the rear field of view and to reduce the width of the silk-screen printed deposit 70 that is formed on the periphery of the rear window 7 in order to hide the portion of the post 3 that is visible from the outside.

Figure 6:
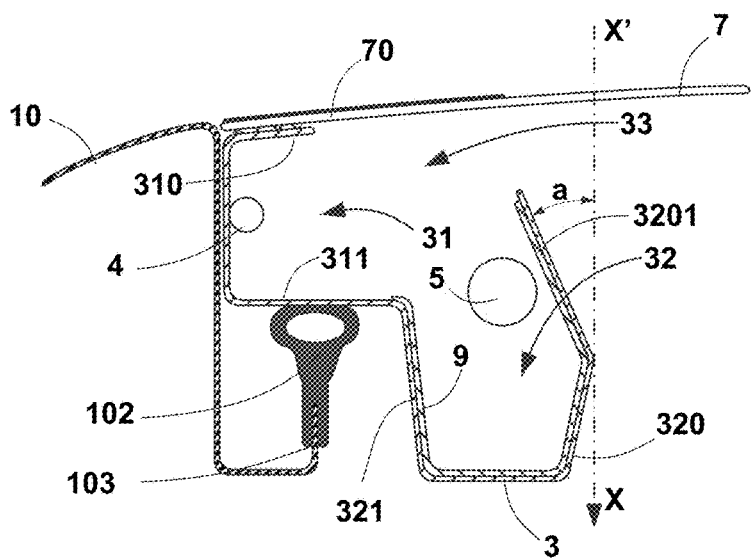
FIG. 6 is a schematic cross-sectional view of a hatch post according to a third embodiment of the invention.

FIG. 6 shows a third embodiment, in which, in order to reinforce the structure of the hatch, the inside wall 320 of the second cavity comprises an extension 3201 that extends towards the rear and forms an angle a with the longitudinal direction XX', so as to increase the rear field of view.

When the rear window 7 has a cavity oriented in the direction XX', it is possible to slightly open the bonding track towards the rear by arranging the rear wall 310 of the first cavity 31 such that it forms a non-zero angle with the direction YY', as can be seen in FIG. 6.

The rear hatch 2 as described above is preferably formed, in each of the embodiments, by means of molding, from a thermoplastic or thermosetting material. Under these conditions, the posts 3 are formed integrally with the upper portion 20 and the lower portion 21 of the hatch.

It will be noted that the posts comprise undercuts in the direction XX' which is the main extraction direction of the part. It would also be necessary to provide a mold comprising trays that move laterally in order to mold the walls of the first cavity or, in the case of the embodiment shown in FIG. 6, to mold the extension 3201 of the inside branch 320 of the second cavity 32.

LIST OF REFERENCE SIGNS

1 vehicle
10 body/chassis
101 roof segment
102 seal
103 rabbet supporting the seal
2 hatch
20 upper portion of the hatch
21 lower portion of the hatch
22 hinge
3 post
31 first cavity
310 rear wall of the first cavity
3100 rear face of the rear wall of the first cavity
311 front wall of the first cavity
3110 front face of the front branch of the first cavity
32 second cavity
320 inside wall of the second cavity
3201 extension of the inside wall of the second cavity
321 outside wall of the second cavity
33 free space
34 point of convergence
4 cable harness
5 actuator
51 attachment point of the actuator arranged on the body/chassis of the vehicle
52 attachment point of the actuator arranged on the hatch
6 trim element
7 rear window
70 silk-screen printed deposit
71 adhesive tape
8 rearview mirror
9 reinforcement part
XX' longitudinal axis of the vehicle (rear/front)
YY' transverse axis of the vehicle (right/left).
ZZ' vertical axis of the vehicle
Y0 longitudinal median plane, perpendicular to the axis YY'
$I_1$, $I_2$ thickness of the post in the longitudinal direction
a rearview angle

The invention claimed is:

1. A vehicle hatch configured to be rotatably mounted, by means of one or more hinges, to a roof segment that forms part of a body of a vehicle, said hatch comprising at least one lateral post to which a rear window is attached, the post forming a profile having an open cross section and comprising a first and a second U-shaped cavity that each comprise two lateral walls, characterized in that the first cavity faces a median plane of the vehicle, such that the U comprises a rear wall that is arranged towards a rear of the vehicle and a front wall that is arranged towards a front of the vehicle, and in that the second cavity is oriented towards the rear of the vehicle, such that the U comprises an inside wall that is arranged on a side of the median plane, and an outside wall that is arranged opposite the median plane towards a lateral edge of the vehicle, and in that the front wall of the first cavity is arranged so as to be continuous with the outside wall of the second cavity, and in that the rear wall of the first cavity is separated from the inside wall of the second cavity so as to free up a free space that allows for access to an inner portion of the profile formed by an inside space of said first and said second U-shaped cavity.

2. The vehicle hatch according to claim 1, wherein the front face of the front wall of the first cavity forms a bearing surface that is intended to be brought into contact with a seal arranged on the body of the vehicle.

3. The vehicle hatch according to claim 1, wherein the rear window is adhesively bonded to the outside face of the rear wall of the first cavity.

4. The vehicle hatch according to claim 1, wherein a cable harness runs inside an interior space defined by the first cavity.

5. The vehicle hatch according to claim 1, wherein an actuator, which is hinged between the roof segment and the hatch, is arranged in an interior space of the second cavity in order to facilitate the opening or closing of the hatch.

6. The vehicle hatch according to claim 1, wherein the length of the inside wall of the second cavity is shorter than that of the outside wall of said second cavity, so as to increase the rear field of view.

7. The vehicle hatch according to claim 1, wherein the length of the inside wall of the second cavity is greater than that of the outside wall of said second cavity, and wherein an extension of the inside wall of the second cavity curves away from the median plane towards the lateral edge of the vehicle, forming a non-zero angle with a longitudinal direction XX', so as to increase the rear view.

8. The vehicle hatch according to claim 1, wherein a reinforcement part is arranged on the inside wall or the outside wall of the second cavity.

9. The vehicle hatch according to claim 8, wherein the reinforcement part extends from the outside wall of the second cavity as far as an end of the rear wall of the first cavity.

10. The vehicle hatch according to claim 1, wherein the rear wall of the first cavity forms a non-zero angle with a transverse direction YY'.

11. The vehicle hatch according to claim 1, wherein a removable trim element is arranged between an end of the rear wall of the first cavity and an end of the inside wall of the second cavity, in order to block a free passage of the profile that forms the post.

12. The vehicle hatch according to claim 1, wherein the profiles of the posts are formed integrally with an upper portion and a lower portion of the hatch, the hatch being produced by means of molding, from a thermosetting or thermoplastic material.

13. A vehicle comprising:
a body including a roof segment; and
a hatch rotatably mounted, via one or more hinges, to the roof segment, the hatch comprising at least one lateral post to which a rear window is attached, the post having an open cross-section and comprising a first U-shaped cavity and a second U-shaped cavity;
wherein the first U-shaped cavity faces a median plane of the vehicle, such that the cavity comprises a rear wall proximate a rear end of the vehicle and a front wall proximate a front end of the vehicle,
wherein the second U-shaped cavity is oriented towards the rear end of the vehicle, such that the cavity comprises an inside wall arranged on a side of the median plane and an outside wall arranged opposite the median plane, towards a lateral edge of the vehicle;
wherein the front wall of the first U-shaped cavity is continuous with the outside wall of the second U-shaped cavity; and
wherein the rear wall of the first cavity is separated from the inside wall of the second cavity to form a free space that allows for access to an inner portion of the first U-shaped cavity and the second U-shaped cavity.

* * * * *